No. 702,679. Patented June 17, 1902.
G. N. SAUM & M. MERCATORIS.
AIR BRAKE TESTING APPARATUS.
(Application filed Jan. 6, 1902.)

(No Model.) 3 Sheets—Sheet 2.

Witnesses:
Inventors:

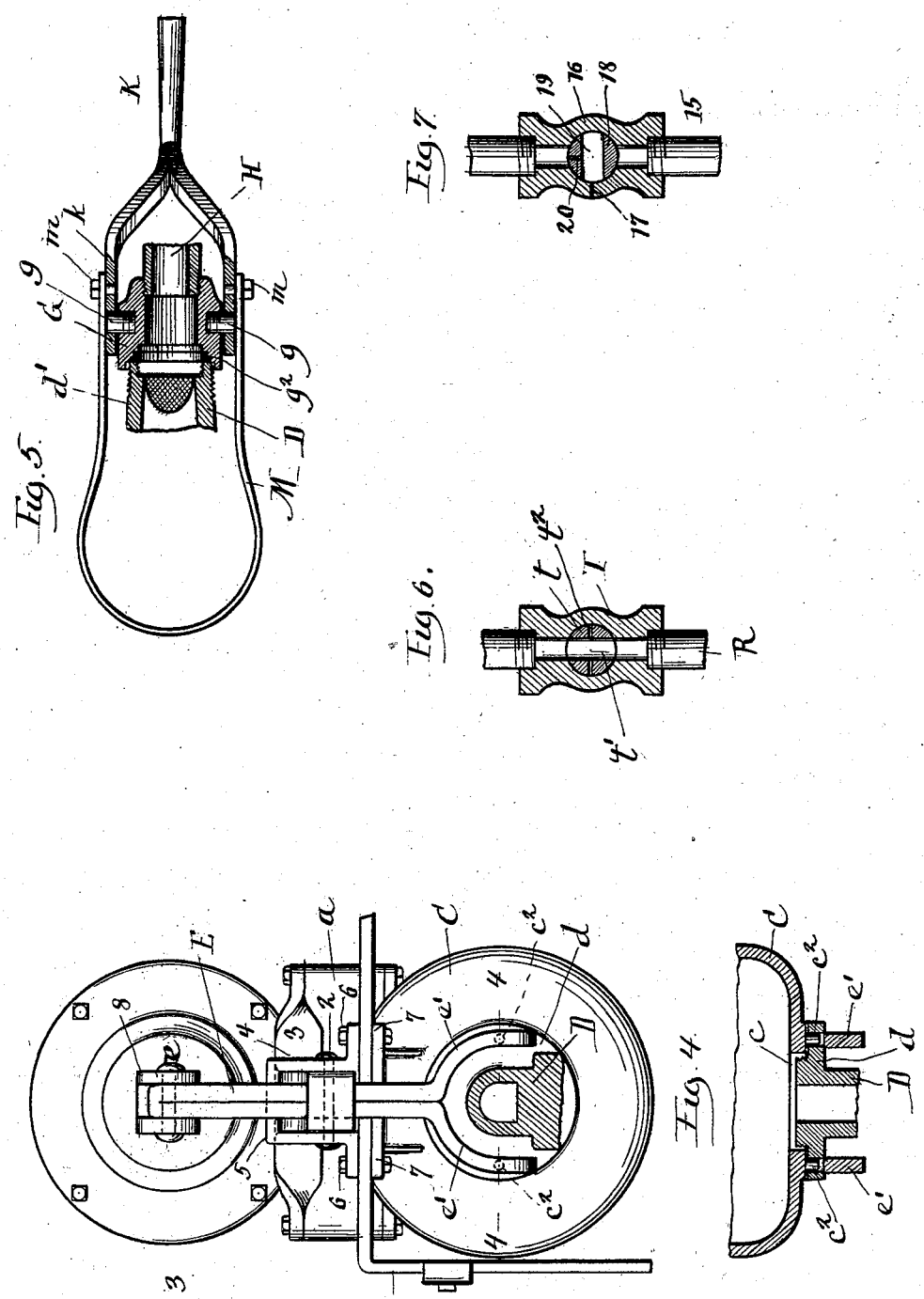

UNITED STATES PATENT OFFICE.

GEORGE N. SAUM AND MORRIS MERCATORIS, OF CHICAGO, ILLINOIS.

AIR-BRAKE-TESTING APPARATUS.

SPECIFICATION forming part of Letters Patent No. 702,679, dated June 17, 1902.

Application filed January 6, 1902. Serial No. 88,687. (No model.)

*To all whom it may concern:*

Be it known that we, GEORGE N. SAUM and MORRIS MERCATORIS, citizens of the United States, and residents of Chicago, in the county of Cook and State of Illinois, have jointly invented certain new and useful Improvements in Air-Brake-Testing Apparatus, of which the following is a full, clear, and exact description.

This invention has for its object to provide means whereby the triple valves of air-brake mechanism used upon railway-cars may be quickly and thoroughly tested.

The triple valves of air-brake systems frequently get out of order, necessitating the return of the triple valves to the car-shops, so that the necessary repairs thereto may be made. The need of some simple and effective means whereby triple valves may be tested when out of service in order to determine their condition, and more particularly to detect the defective points of the valves, has long been experienced.

In testing triple valves it is desirable not only that the testing apparatus shall enable the valve to be subjected to the conditions that will occur in actual use, but it is desirable also that provision be made whereby the defective points of the valve may be determined by the tests.

A further desideratum is that provision be made whereby the triple valves to be tested may be quickly connected to and disconnected from the apparatus by which the testing is effected.

Our present invention enables triple valves to be quickly and thoroughly tested in such manner as not only to determine their condition for service, but also to insure that any defects existing in the triple valves shall be readily located.

The invention consists in the features of novelty hereinafter described, illustrated in the accompanying drawings, and particularly pointed out in the claims at the end of this specification.

Figure 1:
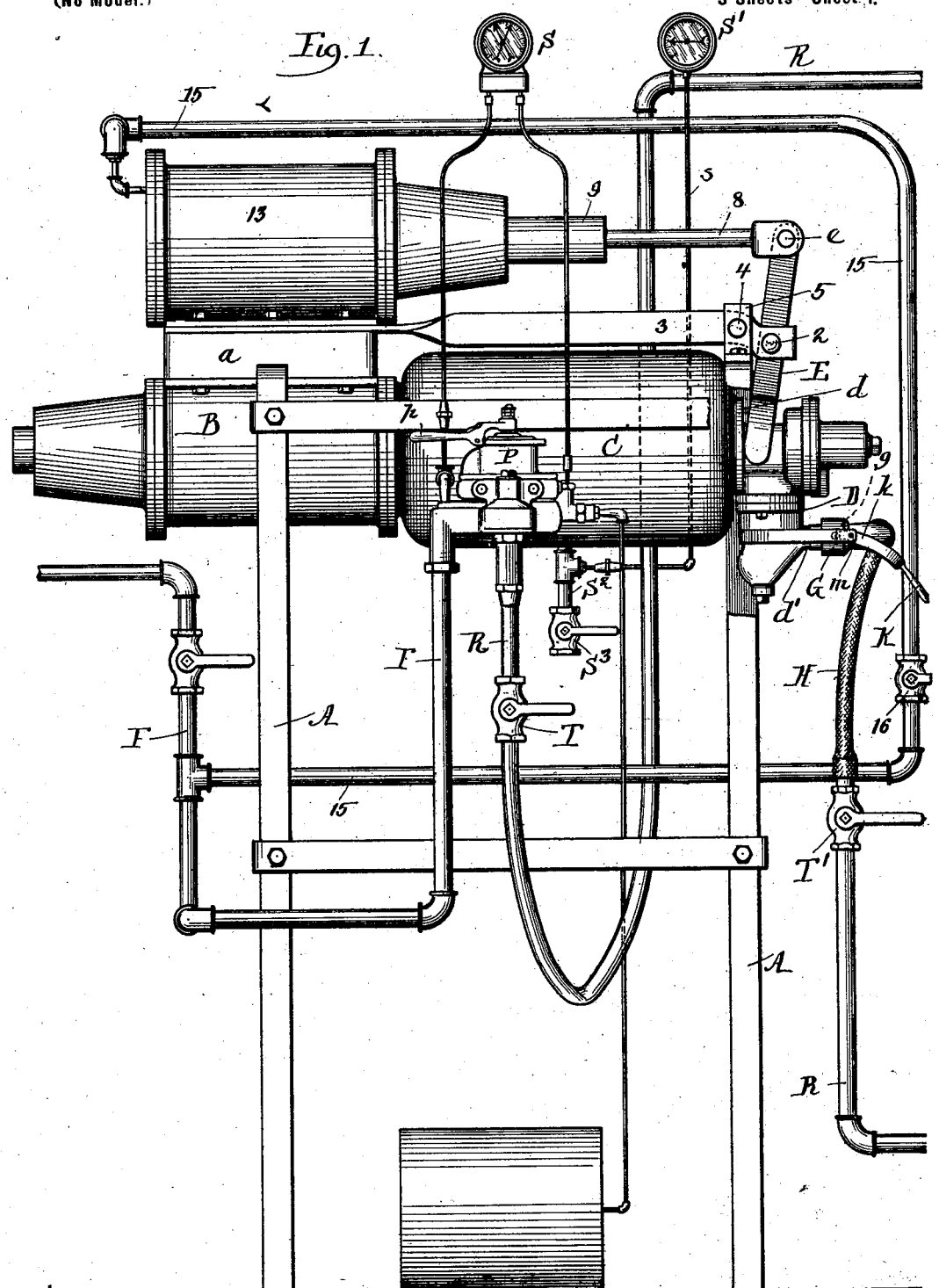
Figure 2:
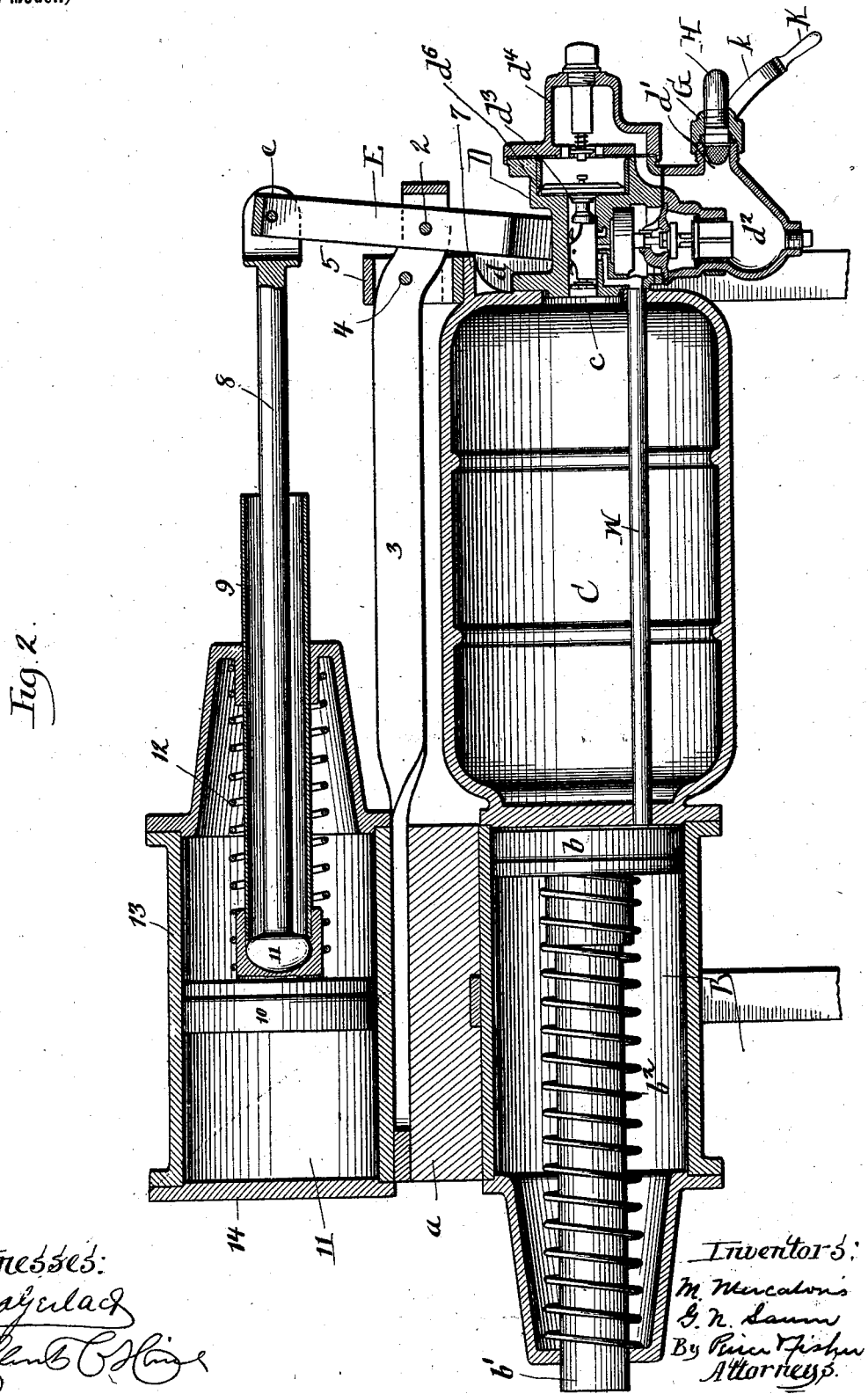

Figure 1 is a view in side elevation of a testing apparatus embodying our invention. Fig. 2 is a view in central vertical section through the testing apparatus. Fig. 3 is an end view, a portion of the triple-valve body being shown in section. Fig. 4 is a detail view in cross-section on line 4 4 of Fig. 3. Fig. 5 is an enlarged detail view in horizontal section through the clamp mechanism for connecting the cap to the triple valve. Fig. 6 is a detail view in longitudinal section through the cock in the pipe leading from the engineer's valve. Fig. 7 is a view in longitudinal section through the cock in the pipe connected to the triple valve.

The frame or support A, whereby the testing apparatus will be sustained, may be of any suitable construction and material. As shown, the frame consists of posts or uprights connected together by cross-bars. Upon a block $a$ at the top of the frame A is mounted a cylinder B and reservoir C, this cylinder and reservoir being similar to the ordinary freight-car cylinder and reservoir of the well-known "Westinghouse air-brake system," the cylinder B being provided with the usual piston $b$, from which extends the piston-rod $b'$, that is encircled by the release-spring $b^2$. At the front end of the reservoir C and at opposite sides of the opening $c$ are formed the studs $c^2$, whereby the triple valve D will be centered upon the cylinder, the flange $d$ of the triple valve D being provided with holes into which the studs $c^2$ will pass.

The usual manner of connecting a triple valve to the end of a reservoir, such as the reservoir C, is to provide bolts at the points at which the studs $c^2$ are shown in the accompanying drawings, such bolts being furnished with threaded ends adapted to receive nuts, whereby the flange of the triple valve can be forced into close bearing with the end of the cylinder.

Inasmuch as in the use of our testing apparatus the triple valve is to be connected to the cylinder for a very short time, and inasmuch as it is important that provision be made whereby the valve should be securely held against the end of the cylinder during the testing operation, one object of our invention is to provide means whereby the triple valve may be detachably clamped to the end of the cylinder, so that the necessity for the use of threaded bolts and nuts to effect the temporary union of the valve and cylinder may be avoided. This object we have accomplished by providing a clamp whereby the triple-valve mechanism may be firmly held against the end of the cylinder so long as the valve is being tested, and whereby when the test has been completed the valve can be quickly withdrawn in order to enable another valve to be quickly subjected to the testing operation. While other forms of clamps for detachably connecting the triple valve to the end of the cylinder may be used, it is preferred that the clamp mechanism shown in the accompanying drawings be employed. This clamp mechanism comprises a forked arm or lever E, that is pivoted, as at 2, to the end of a bracket 3, projecting at the front of the apparatus. Preferably the bracket 3 is formed from a rod or bar bent as shown, the sides of the bar lying parallel and the rear ends of the bar being securely bolted to the top of a block $a$. As shown, the front end of the bracket or support 3 for the clamp-lever E is connected by a cross-bolt 4 with a bracket or yoke 5, the base of which is bolted, as at 6, to a flange 7, projecting at the front end of the reservoir C. The clamp-lever E is preferably operated by compressed air, and the upper end of the lever E is pivoted, as at $e$, to the outer end of the rod 8, that sets within the tubular stem or trunk 9 of a piston 10, the inner end of the rod 8 being preferably ball-shaped, as at 11, and engaging a corresponding seat or socket at the back of the piston. The trunk or stem 9 of the piston 10 is encircled by a coil-spring 12, that serves to normally force the piston 10 toward the rear or inner end of its cylinder 13. The cylinder 13 is shown as bolted to the top of the block $a$ above the cylinder B. To the end 14 of the cylinder 13 is connected an air-delivery pipe 15, this pipe being suitably joined with the main reservoir-pipe F, as clearly shown in Fig. 1 of the drawings. In the pipe 15 is placed a cock 16, the details of which are shown in Fig. 7 of the drawings. The casing of the cock 16 is formed with an exhaust-hole 17, and the plug 18 of the valve (the outer end of which will be provided with a suitable handle) is formed with the usual port or channel 19, that will connect the sections of the pipe for the free passage of air. From the port 19 extends laterally a channel 20, whereby the air from the pipe 15 may be exhausted to the atmosphere when the port 20 is brought coincident with the exhaust-port 17 of the casing. It will be understood, of course, that in the position of the plug 18 for passage of air through the pipe 15 the port 20 will be opposite the position shown in Fig. 7.

The bifurcated ends $e'$ of the clamp-lever E are spread apart sufficiently to straddle the body of the triple valve D and bear against its flange $d$ at points opposite the short stud $c^2$ at the end of the cylinder C. Hence it will be seen that if the triple valve D be set against the end of the cylinder with the stud $c^2$ in the holes of the triple-valve flange, (the clamp-lever E being at such time in the position that it occupies when the piston 10 is at its innermost position,) then if air be admitted by pipe 15 to the cylinder 13 the piston 10 will be forced forwardly, thereby causing the rod 8 to shift the clamp-lever E to the position shown in Fig. 1, and thus cause the clamp-lever to securely hold the triple valve against the end of the cylinder C. After the triple valve D has been thus positioned upon the end of the cylinder C the short pipe or nipple $d'$, whereby the check-valve casing $d^2$ of the triple valve is ordinarily connected to the train-pipe, will be engaged by a cap G, that is secured to the end of a pipe H. The end portion of the pipe H, to which the cap G is connected, is in effect a continuation of the train-pipe R and is preferably a flexible pipe to permit the cap to be readily brought to position to engage the nipple of the triple-valve casing. The cap G will be provided with suitable clamp mechanism, whereby it may be detachably connected to the nipple $d'$ of the triple-valve casing, and preferably the clamp mechanism employed for that purpose will be of the construction shown in the accompanying drawings.

From the sides of the cap G project trunnion-pins $g$, to which are pivotally connected the forked arms $k$ of a hand-lever K. To these forked arms $k$ of the hand-lever are pivotally connected, as at $m$, the ends of a clamp strap or band M, that is adapted to encircle the body of the triple-valve casing, as clearly shown in Figs. 1 and 2 of the drawings. Preferably the strap M is of spring metal and in its normal condition is partly curved at its crown, as shown in Fig. 5. When the pipe H is to be connected with the triple-valve casing, the strap M will be set about the triple-valve casing, the clamp-lever K being at such time turned downward, so as to enable the crown or bowed portion of the strap M to readily fit over the triple-valve casing. Then by turning upward the hand-lever K the ends of the strap M will be drawn forward until they are practically in line with the trunnion-lugs $g$. This drawing forward and upward of the ends of the strap M causes the strap to tightly bind against the triple-valve casing and causes the packing-ring $g^2$ within the cap G to firmly bear against the end of the nipple $d'$ of the triple-valve casing. When the pipe H has thus been connected by the cap G with the triple-valve casing, the test of the triple valve will be made.

By reference more particularly to Fig. 1 of the drawings it will be seen that at one side of the main frame is mounted an engineer's valve P, which may be the same in its construction as the engineer's valve commonly used in the cab of the locomotive for controlling the operation of the ordinary air-brake system, the mechanism of the engineer's valve being controlled by the usual handle $p$. To this valve P is connected the pipe F, that leads from the main air-reservoir, and to the casing of the engineer's valve is also connected the pipe R, that corresponds with the train-pipe of the ordinary air-brake system. The engineer's valve is shown as equipped with the usual pressure-gage and connections S, and a pressure-gage S' is also connected by a pipe $s$ with the short pipe $S^2$, that is coupled to the reservoir C, this pipe $S^2$ being furnished with an exhaust-valve $S^3$ of ordinary construction. The pipe H corresponds with the end of the train-pipe, and this train-pipe has interposed therein a cock T, the preferred construction of which is illustrated in detail in Fig. 6 of the drawings—that is to say, the plug $t$ of the cock T is provided with the usual passage $t'$, and at right angles through the plug extends a very small passage $t^2$, the function of which will presently more fully appear. In the train-pipe R is also interposed a cock T', preferably located adjacent the lower end of the pipe-section H, and the construction of this cock T' and its casing will preferably be the same as that of the cock 16. (Illustrated in Fig. 7.) It will be understood, of course, that when the triple valve has been clamped against the end of the auxiliary reservoir C in the manner above described communication will be established between the slide-valve chamber $d^3$ of the triple valve and the auxiliary reservoir C, and communication will also be established between the emergency-valve casing $d^4$ of the triple valve and the pipe W, that leads through the auxiliary reservoir C to the brake-cylinder B.

From the foregoing description the operation of our improved apparatus for testing a triple valve will be seen to be as follows: Air being admitted from the main reservoir (not shown) through the pipe F will pass to the engineer's valve P in the usual manner and will pass by the train-pipe R and flexible pipe H to the triple valve D, the cocks T and T' being at such time in open position. The operator making the test will then manipulate the handle $p$ of the engineer's valve in the same manner in which such valve-handle would be manipulated in ordinary service operation. The movement of the rod $b'$ of piston $b$ through the end of the cylinder B will show how accurately the triple valve responds to the operation of the engineer's valve and will indicate in a general way the condition of the triple valve.

In order to more delicately test the triple valve and to determine whether the leak-port in the cylinder of the triple-valve piston is of proper size and in proper condition, the operator will turn the plug of the cock T to closed position—i. e., opposite that shown in Fig. 6—so as to bring the small channel $t^2$ of the plug in line with the pipe R. The operator will then manipulate the engineer's valve, as in making the ordinary service application, for example, so as to make a reduction of from seven to ten pounds pressure. The reduction in pressure thus made at the engineer's valve will gradually be effected in the train-pipe R and in the check-valve chamber $d^2$ and drain-cup of the triple valve.

Now it is obvious that if the leak-port $d^6$ in the cylinder of the triple valve be too large, or if there be any leakage around the piston of the triple valve owing to a defective packing-ring or like cause, air will pass from the auxiliary reservoir C through the leak-port $d^6$ and through any leakage around the triple-valve piston as rapidly as the exhaust of air from the pipe R is being effected through the small port $t^2$ of the cock T. Hence there will be no shifting of the triple-valve piston and of the valve connected therewith to admit air to the brake-cylinder C, and consequently there will be no movement of the piston $b$ or of its rod $b'$. The operator thus seeing that the rod $b'$ does not move will know at once that the leak-port of the triple-valve cylinder is too large or that there is a leakage about the triple-valve piston. Having determined the condition of the triple-valve piston and of the leak-port, the operator will turn the cock T to open position and will then restore the train-pipe pressure, after which a reduction of train-pipe pressure will be made by the engineer's valve, so as to shift the triple valve to the position that it will occupy when the brakes of the train are applied or set. The operator will then turn the cock T' to the position seen in Fig. 7, so as to cut off communication between the pipe-section H and the engineer's valve and at the same time establish communication between the pipe-section H and the atmosphere through the plug of the cock T and the small port $t^2$ of the cock-casing. When the cock T is thus turned to closed position, the condition corresponds to that of a train moving with its brakes set. If any exhaust to the atmosphere occurs through the port $t'$ in the cock T, (which may readily be detected by the operator,) the operator will know at once that there is a leakage around the check-valve of the triple valve or that the triple-valve piston does not close perfectly to prevent the passage of air from the auxiliary reservoir to the train-pipe. Having ascertained and located the defects, if any, in the triple valve, the air will be exhausted from the auxiliary reservoir C through pipe $s^2$ by manipulation of the cock $s^3$, and passage of air to the triple valve through the train-pipe will be cut off, and the operator will then manipulate the valve 16, so as to exhaust air from the cylinder 13, and thus release the clamp-lever E, and will force downward the hand-lever K, so as to permit the cup G to be withdrawn from the triple valve. The triple valve thus tested will then be removed and another valve to be tested will be substituted in its place.

It is manifest that the precise details of construction above set out may be varied without departing from the spirit of the invention. Thus it is not essential that the auxiliary reservoir C and brake-cylinder D should be connected together, nor is it necessary that the triple valve should be connected directly to the end of the brake-reservoir, nor do we wish the claims hereinafter made to be understood as restricted to a construction in which the port-plate to which the triple valve is clamped is formed directly upon the end of the reservoir. One marked advantage of the present invention is that the parts of the apparatus are so disposed that during the testing operation the triple valve is supported in close proximity to the engineer's valve, so that while the operator is manipulating this valve he is still in position to detect any defects existing in the triple valve.

Having thus described our invention, what we claim as new, and desire to secure by Letters Patent, is—

1. A testing apparatus for triple valves comprising a supporting-frame, a testing reservoir and brake-cylinder mounted upon said frame and a clamp sustained by said frame adjacent the port-plate of the reservoir and adapted to detachably hold a triple valve in position upon said plate.

2. A testing apparatus for triple valves comprising a supporting-frame, a plate sustained by said frame and having centering-studs adapted to enter holes in the flange of a triple valve and a clamp sustained by said frame and arranged in proximity to said plate for detachably holding the triple valve upon said studs and against said plate.

3. A testing apparatus for triple valves comprising a supporting-frame, a plate sustained by said frame and having centering-studs adapted to enter holes in the flange of a triple valve and a clamp-lever sustained by said frame and arranged in proximity to said plate for engaging the flange of the triple valve and holding the same in position upon said studs during the testing operation.

4. In a testing apparatus for triple valves, the combination with a plate having centering-studs adapted to enter holes in the flange of a triple valve, and a clamp-lever for holding the triple valve against said plate and means for operating said clamp-lever.

5. In a testing apparatus, for triple valves, the combination with a plate having centering-studs adapted to enter holes in the flange of a triple valve, a pivoted clamp-lever adapted to engage the flange of the triple valve and hold it against said plate and a cylinder having a piston connected to said clamp-lever, whereby said lever is operated.

6. A testing apparatus for triple valves comprising a supporting-frame, a reservoir and cylinder and an engineer's valve mounted upon said frame, suitable air-pipes connected with said parts, and clamp mechanism for detachably holding the triple valve in position upon the port-plate through which air passes from the reservoir.

7. A testing apparatus for triple valves comprising a suitable supporting-frame, a reservoir port-plate sustained by said frame, clamp mechanism for detachably connecting a triple valve to said port-plate, an air-pipe provided with a cap adapted to engage the nipple of the triple-valve casing and a clamp for detachably holding said cap upon said nipple.

8. A testing apparatus for triple valves comprising a supporting-frame, a port-plate sustained by said frame, a clamp for detachably connecting a triple valve to said port-plate, an air-pipe provided with a controlling-cock and provided at its end with a cap adapted to engage a nipple of the triple-valve casing and a clamp for detachably holding said cap upon said nipple.

9. A testing apparatus for triple valves comprising a suitable supporting-frame, a reservoir port-plate sustained by said frame, clamp mechanism for detachably connecting a triple valve to said port-plate, an air-pipe provided with a cap adapted to engage the nipple of the triple-valve casing, a clamp for detachably holding said cap upon said nipple, said clamp comprising a band arranged to set around the lower part of the triple-valve casing and a lever pivotally connected to said band and to said cap.

10. In testing apparatus for triple valves, the combination with a suitable support and with an auxiliary reservoir and brake-cylinder and an engineer's valve, of means for connecting with said parts the triple valve to be tested, a pipe corresponding to the train-pipe and service extending between the engineer's valve and the triple valve and a cock located in said pipe and having a supplemental restricted port through which air may be exhausted from the triple-valve casing.

GEO. N. SAUM.
MORRIS MERCATORIS.

Witnesses:
GEO. P. FISHER, Jr.,
ALBERTA ADAMICK.